(12) United States Patent
Cai

(10) Patent No.: US 8,452,315 B1
(45) Date of Patent: May 28, 2013

(54) APPARATUS, METHOD AND COMPUTER-READABLE MEDIUM FOR DISPATCH GROUP CALLING ACROSS FLEETS

(75) Inventor: Zheng Cai, Fairfax, VA (US)

(73) Assignee: Nextel Communications Inc., Reston, VA (US)

( * ) Notice: Subject to any disclaimer, the term of this patent is extended or adjusted under 35 U.S.C. 154(b) by 865 days.

(21) Appl. No.: 11/684,219

(22) Filed: Mar. 9, 2007

(51) Int. Cl.
*H04B 7/00* (2006.01)

(52) U.S. Cl.
USPC .......................................... 455/519; 455/518

(58) Field of Classification Search
None
See application file for complete search history.

(56) References Cited

U.S. PATENT DOCUMENTS

| | | | | |
|---|---|---|---|---|
| 5,423,061 | A * | 6/1995 | Fumarolo et al. | 455/519 |
| 5,815,799 | A * | 9/1998 | Barnes et al. | 455/15 |
| 6,021,326 | A * | 2/2000 | Nguyen | 455/422.1 |
| 6,067,457 | A * | 5/2000 | Erickson et al. | 455/512 |
| 6,272,334 | B1 * | 8/2001 | Rao | 455/418 |
| 6,292,657 | B1 * | 9/2001 | Laursen et al. | 455/411 |
| 6,363,249 | B1 | 3/2002 | Nordeman et al. | |
| 6,763,243 | B2 * | 7/2004 | Wolf et al. | 455/519 |
| 6,766,397 | B2 * | 7/2004 | O'Hare et al. | 710/200 |
| 6,792,281 | B2 * | 9/2004 | Upp et al. | 455/519 |
| 6,898,436 | B2 * | 5/2005 | Crockett et al. | 455/518 |
| 6,999,465 | B2 * | 2/2006 | McDonald et al. | 370/432 |
| 7,035,657 | B2 * | 4/2006 | Chen et al. | 455/518 |
| 7,184,790 | B2 * | 2/2007 | Dorenbosch et al. | 455/519 |
| 7,197,552 | B2 * | 3/2007 | Zollner et al. | 709/223 |
| 7,636,581 | B1 * | 12/2009 | Choksi et al. | 455/519 |
| 2002/0114302 | A1 * | 8/2002 | McDonald et al. | 370/338 |
| 2002/0169862 | A1 * | 11/2002 | Bialk et al. | 709/223 |
| 2004/0082352 | A1 | 4/2004 | Keating et al. | |
| 2007/0037596 | A1 * | 2/2007 | Shaffer et al. | 455/518 |

* cited by examiner

*Primary Examiner* — Yuwen Pan
*Assistant Examiner* — Ayodeji Ayotunde

(57) ABSTRACT

An apparatus, method and computer-readable medium for controlling dispatch voice communications between fleets in a network are provided. The apparatus includes a multi-fleet dispatch console configured to receive a request for a dispatch group call including dispatch stations in a plurality of fleets and to establish the dispatch group call based upon the request. The multi-fleet dispatch console has a higher priority than any other dispatch console in the network. According to the method, the multi-fleet dispatch console may also determine whether a requestor of the dispatch group call is authorized to establish the requested dispatch group call and output an authorization denial message, if the requestor is not authorized to establish the dispatch group call. Additionally, the multi-fleet dispatch console may drop unavailable dispatch stations from existing group calls, if a priority of the request exceeds a priority of the existing group calls.

16 Claims, 3 Drawing Sheets

APPARATUS, METHOD AND COMPUTER-READABLE MEDIUM FOR DISPATCH GROUP CALLING ACROSS FLEETS

BACKGROUND OF THE INVENTION

The present invention relates to an apparatus, method and computer-readable medium for controlling dispatch group calling across fleets in a dispatch calling network.

Some wireless communication networks, such as the iDEN network owned and operated by Sprint Nextel Communications, Inc., can provide two different types of voice communications services, i.e., interconnect and dispatch. An interconnect communication is what is conventionally considered "cellular communications," while a dispatch communication is commonly known as a walkie-talkie or push-to-talk (PTT) type of call such as Nextel's service identified by the trade name Direct Connect.

Dispatch calls can be private calls or group calls. A dispatch private call is between two dispatch stations and a dispatch group call is between more than two dispatch stations. A talk group is a number of different communication stations which can be joined into a single communication session by dialing a single call identifier (i.e., a predetermined group call) or by selecting a group of invitees and dialing a dispatch call (i.e., an ad-hoc group call). In a group call, whereas only one party at a time is able to speak during the call, all parties can hear the communications of the other parties on the call.

Group calls are a popular means of communication for public safety organizations, such as police and fire departments. These group dispatch calls allow for members of a response team to communicate with each other at the scene of an incident. However, sometimes all of the response team members are not participants in the same group call. For example, one group call may be established between responding members of the fire department and a second group call may be established between responding members of the police department.

In known communication networks, a separate dispatch console is used for each fleet, which is a logical or functional organization of people who communicate with each other. A fleet can be a governmental or municipal department, an agency or an enterprise. A fleet is made up of groups and individual users. A group is made up of at least three individual users and is identified by a group ID, but cannot include other groups. A user may belong to a fleet and one or more groups. For example, a local police department may make up one fleet, which is managed by its own dispatch console, and a local emergency medical unit may make up another fleet, which is managed by its own dispatch console.

The distinction between fleets and groups in some cases is due to the design of a network. For example, in iDEN, Urban Fleet Member Identifications (UFMIs) are employed to initiate a private call. The structure of the UFMI is UUU*FF*MMMM, where there is a three digit urban identifier, a two digit fleet identifier and a four digit member identifier. Predefined group calls within a fleet are designated using a four-digit identifier beginning with a "#" (e.g., #123). Accordingly, different fleets can have the same group identifier for different groups. Because dispatch consoles conventionally are associated with a particular fleet, they are not designed to handle the problems that arise when two dispatch talk groups employ the same group identifier.

A dispatcher is a special user that uses the dispatch console. Within each fleet, a dispatcher can make a group and initiate an ad-hoc dispatch group call or initiate a pre-defined group call or private call with members within the fleet. Generally, a dispatcher or administrator of a fleet can manage only the users or groups within its own fleet. Usually, a fleet has one dispatcher, although a fleet can be configured to have more than one dispatcher. However, dispatch consoles currently do not support cross-fleet communications.

One technique for coordinating communications between group calls in different fleets is to have a third party participate in each group call and relay information between the two group calls. For example, a public safety coordinator who is not on-scene could monitor the communications between the two group calls to determine if the actions of one group affect the actions of the other group, or require coordination with another group/individual. This third party can monitor the overall situation by monitoring the communications of both group calls and communicating with them, or other groups or parties, as necessary based on the monitored communications. However, the involvement of a third party adds delay and unnecessary complication to communications between the two separate groups.

SUMMARY OF THE INVENTION

The present invention provides an apparatus, method and computer-readable medium for dispatch group calling across fleets in a dispatch calling network, which overcome the problems of the prior art. The apparatus according to exemplary embodiments of the present invention includes a multi-fleet dispatch console that is configured to establish communications between dispatch stations in a plurality of fleets. The multi-fleet dispatch console has a higher priority than other dispatch consoles that may be present in the network, and thus may drop group members from existing calls to establish a dispatch group call between dispatch stations in the plurality of fleets.

Other objects, advantages, and novel features of the present invention will become apparent from the following detailed description of the invention when considered in conjunction with the accompanying drawings.

DETAILED DESCRIPTION OF THE EXEMPLARY EMBODIMENTS

Figure 1:
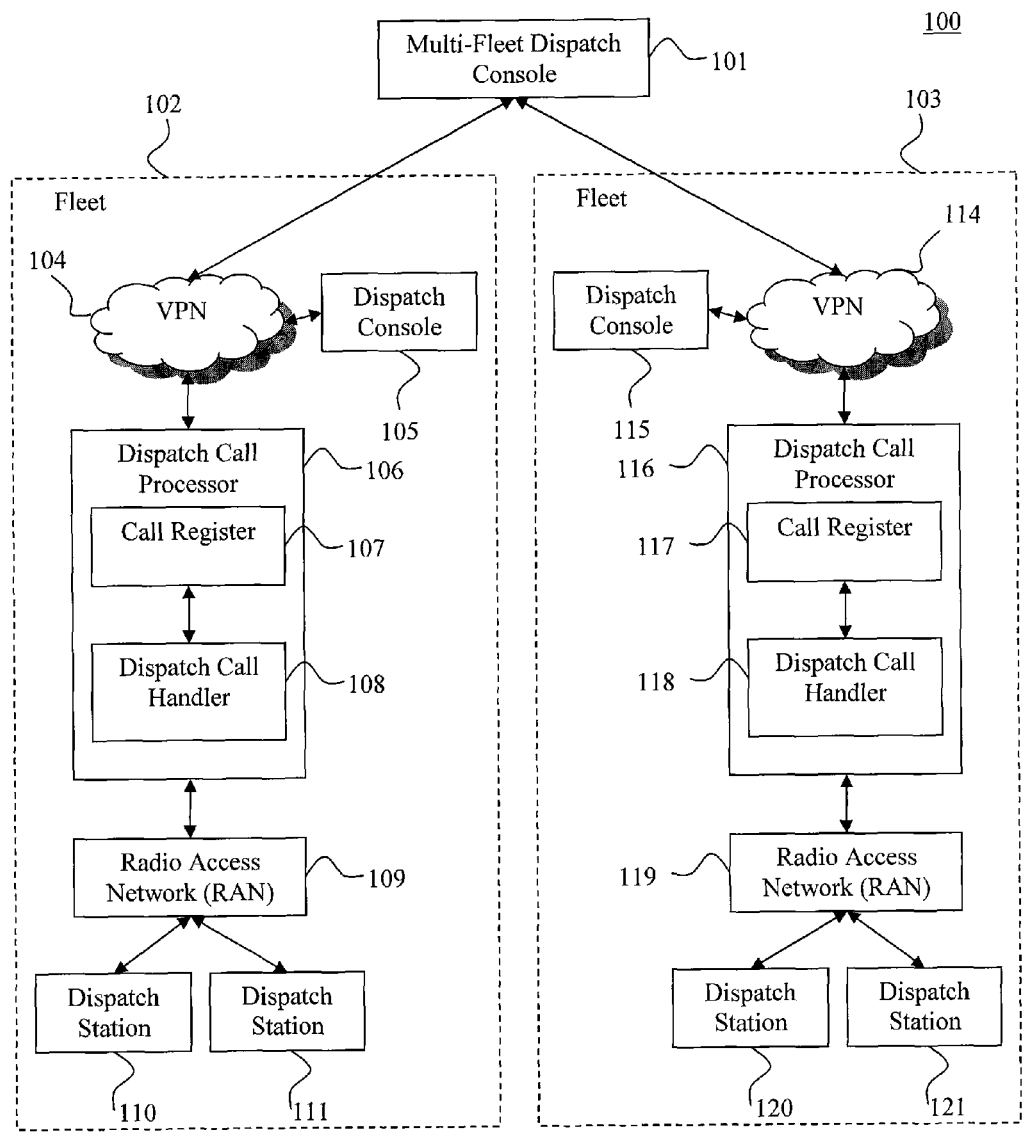
FIG. 1 illustrates an exemplary embodiment of a system in accordance with the present invention.

FIG. 1 illustrates an exemplary embodiment of a system in accordance with the present invention. The system 100 includes a multi-fleet dispatch console 101 and two fleets 102 and 103. Although only two fleets are illustrated for simplicity, any number of fleets may be present in the system according to the present invention. The multi-fleet dispatch console 101 may be in the form of a laptop, desktop, other computer, or other device capable of performing dispatch console operations, which communicates with the fleets 102 and 103 via virtual private networks (VPN) 104 and 114, respectively.

Within each fleet, there is a dispatch console for controlling dispatch communications within the fleet. Fleet 102, for example, includes dispatch console 105, which communicates with a dispatch call processor 106 via the VPN 104. Fleet 102 further includes a radio access network (RAN) 109 and dispatch stations 110 and 111.

A dispatch console is a device and/or computer with dispatch processing software that allows dispatchers/operators to control a plurality of mobile dispatch stations within a fleet. The dispatch console 105 is connected to the mobile dispatch network through a Virtual Private Network (VPN) and is usually located where a fleet organization is located. A dispatch system can include a plurality of VPNs, where each fleet is associated with one VPN. For a software-based dispatch console, the dispatch console can be located at any location as long as the computer with the dispatch console software has Internet access, which may be via broadband cable, dedicated line, LAN, dial-up or wireless access.

Dispatch consoles provide provisioning and management of individual dispatch stations and groups within a fleet, as well as granting priority of dispatch users and setting up dispatch service feature restrictions. For example, dispatch consoles may add, delete or ban a member of a group or fleet, change member priority in a group call, and modify member service restrictions, such as incoming/outgoing call restrictions, talk time restrictions, etc. Dispatch consoles may also query real time member status, provide call forwarding, and initiate private, group and broadcast calls. Through the dispatch console, a dispatcher can initiate a private call to a specific mobile user or a predefined group call. A dispatcher can also make a temporary group and initiate an ad-hoc group call.

A dispatch area is a geographic area, which includes two or more cells that share network subsystems, such as mobile switching centers (MSCs) and location registers. The dispatch call processor 106 is a dispatch area subsystem that includes a call register 107 and a dispatch call handler 108. The call register 107 generally operates in a similar manner to a location register and performs the functions of a home location register (HLR) to register and authenticate the user. The dispatch call handler 108 generally operates in a similar manner to an MSC/visitor location register (MSC/VLR) or a dispatch application processor (DAP). The dispatch call handler 108 supports communications from dispatch stations 110 and 111 via the RAN 109.

Fleet 103 includes a dispatch console 115, VPN 114, dispatch call processor 116 including a call register 117 and dispatch call handler 118, RAN 119, and dispatch stations 120 and 121. The operation of the elements of fleet 103 corresponds to the operation of the elements of fleet 102 and thus the description thereof is not repeated.

The dispatch consoles 105 and 115 can each control communications within their own fleet, but are not configured to control communications between dispatch stations in different fleets. The multi-fleet dispatch console 101, however, is configured to provide control for communications between dispatch stations in a plurality of different fleets. Moreover, the multi-fleet dispatch console 101 is configured to have a higher priority than the fleet-based dispatch consoles (e.g., dispatch consoles 105 and 115). Due to the higher priority, the multi-fleet dispatch console 101 may drop a dispatch station from an existing dispatch call, if the multi-fleet dispatch console 101 has received a request for a cross-fleet dispatch call that includes the dispatch station.

As described above, prior art systems have the cross-fleet communication problem of the same group identifier being used in multiple fleets. To overcome the obstacle of different groups in different fleets having the same group identifier, the multi-fleet dispatch console 101 uses a unique group identifier for each cross-fleet group. For example, a UFMI for each cross-fleet group may be used to initiate a group call across fleets by using a particular fleet identification number reserved for cross-fleet groups (e.g., UUU*99*MMMM, where the number 99 is reserved for cross-fleet groups and the member identifier MMMM is used to identify particular cross-fleet groups). The UFMI, however, is only an example of a cross-fleet group identifier; other identifiers may be used. For example, a Uniform Resource Identifier (URI) (e.g., username@groupABC.domainname.com) specifically identifying a particular cross-fleet group, a Public Switched Telephone Network (PSTN) number (e.g., 123-456-7890) which can be mapped to a particular cross-fleet group, or other identifier may be used, depending upon the network in which it is used.

Accordingly, the multi-fleet dispatch console 101 can be used to allow personnel from different entities (e.g., police department, fire department, ambulance, etc.) to communicate with each other during situations in which a coordinated effort between the entities is needed or desired. Thus, the multi-fleet dispatch console 101 provides improved efficiency in communications between entities in different fleets.

Figure 2:
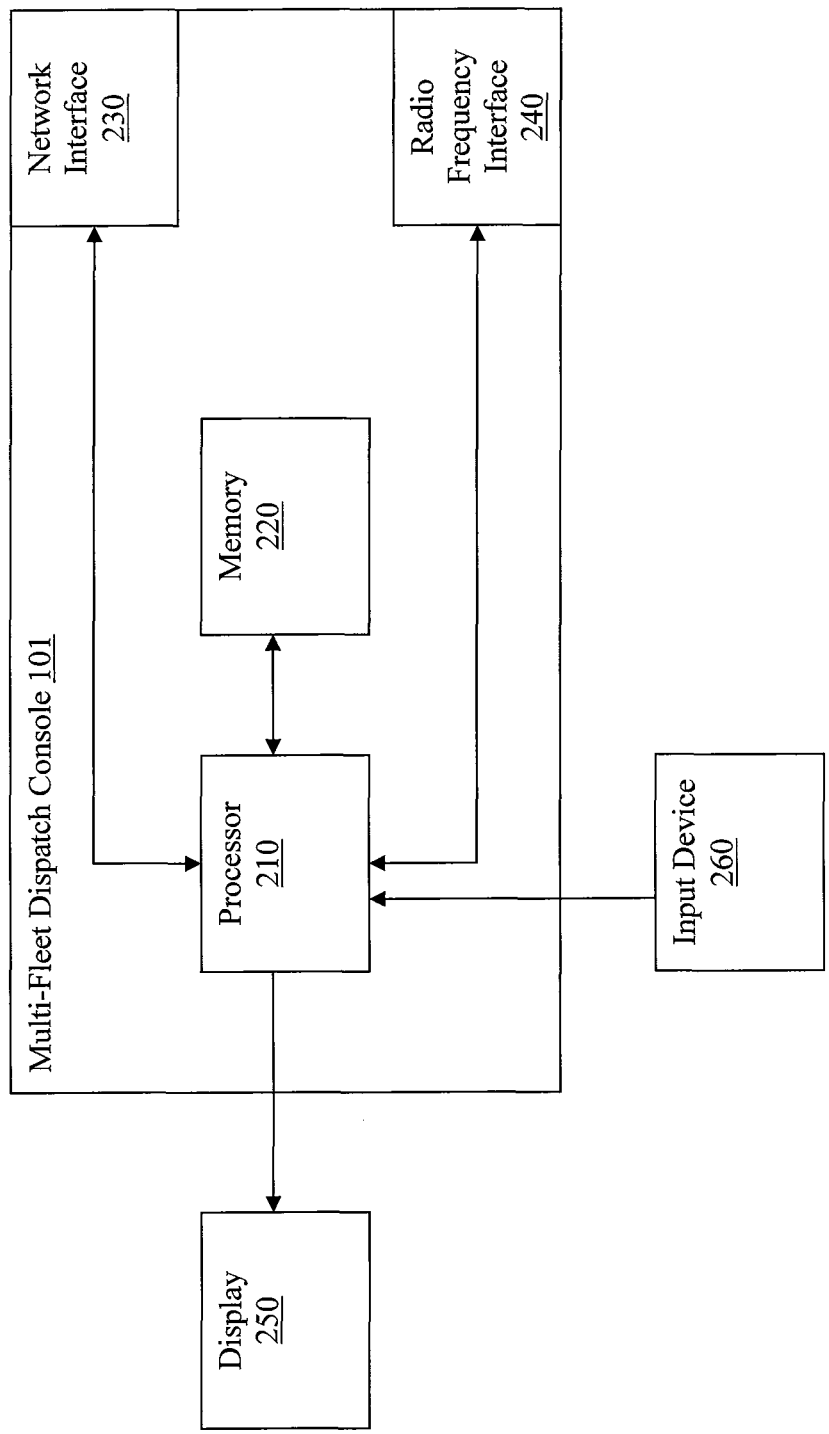
FIG. 2 illustrates an exemplary embodiment of a multi-fleet dispatch console in accordance with the present invention.

FIG. 2 illustrates an exemplary embodiment of a multi-fleet dispatch console in accordance with the present invention. The multi-fleet dispatch console 101 includes a processor 210 coupled to memory 220, network interface 230, radio frequency interface 240, display 250 and input device 260. The processor can be a microprocessor, application specific integrated circuit (ASIC), field programmable gate array (FPGA), or the like. The memory 220 can be random access memory (RAM), flash memory, a hard drive, or the like.

In an exemplary embodiment of the present invention, the multi-fleet dispatch console 101 is a laptop or other type of computer. The multi-fleet dispatch console 101 may be configured for operation by an operator or dispatcher who receives requests for dispatch calls and processes the requests manually. Alternatively, the multi-fleet dispatch console 101 may be configured to receive and process requests for dispatch calls without operator intervention.

In accordance with exemplary embodiments of the present invention, the multi-fleet dispatch console 101 receives a request for a multi-fleet dispatch call, including a request to create an ad-hoc dispatch talk group via radio frequency interface 240 or network interface 230. The multi-fleet dispatch console 101 accesses a group database (not shown) via the network interface 230. The display 250 can provide a web-based interface in order to create the ad-hoc dispatch talk group, define the membership of the ad-hoc dispatch talk group, set priority values for members of the ad-hoc dispatch talk group, and set an expiration time (i.e., the lifetime) of the ad-hoc dispatch talk group. The membership of the ad-hoc dispatch talk group may be defined using talk group IDs of existing dispatch talk groups and/or IDs of individual dispatch stations. The priority values are used to arbitrate access to the floor of a call for the ad-hoc talk group.

Instead of using a web-based interface, the processor 210 can run a program, with its own interface output to display 250, to access the group database. The operator of the multi-fleet dispatch console 101 may program the group database information using input device 260. The input device 260 can be, for example, a keyboard, a pointing device, such as a mouse, or the like.

Figure 3:
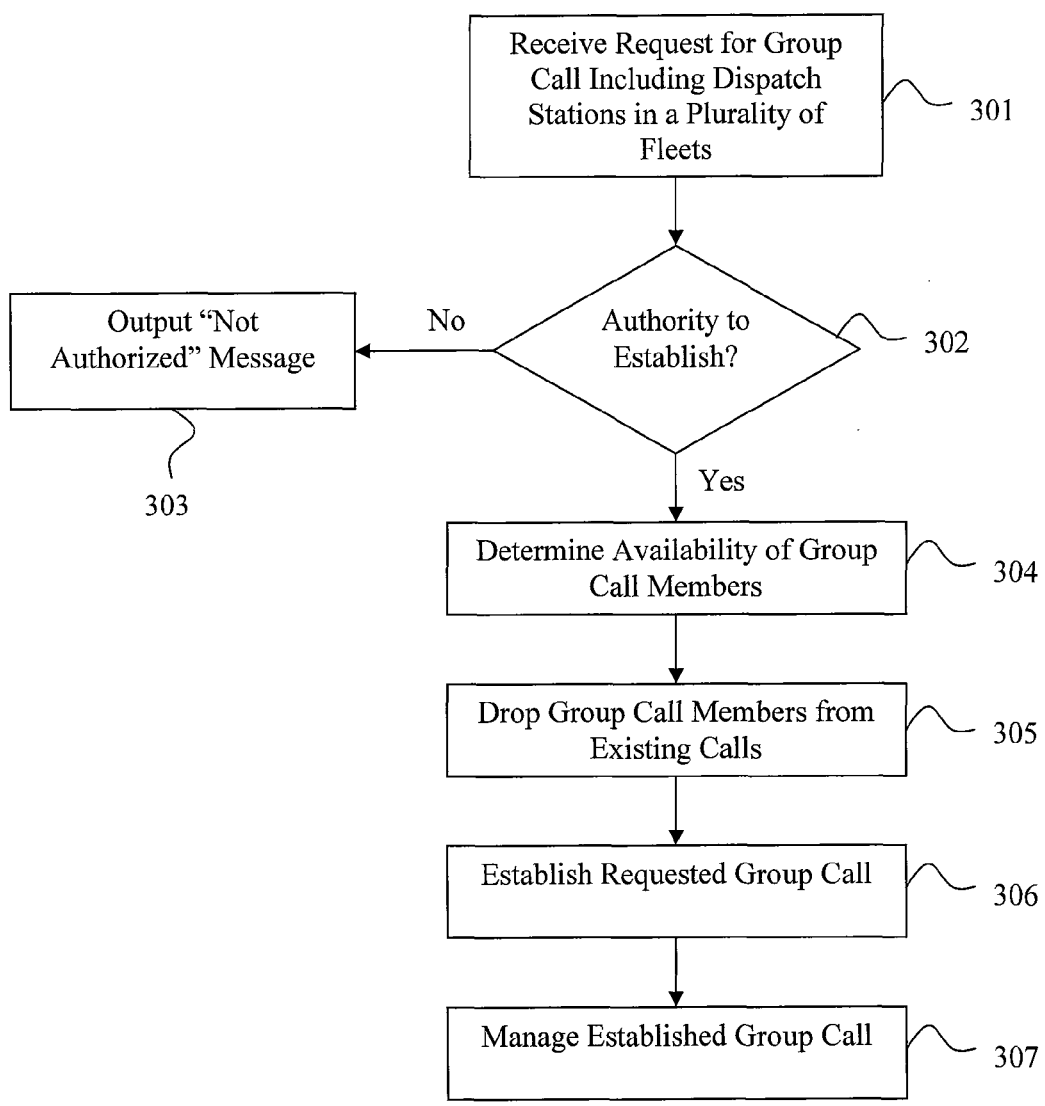
FIG. 3 illustrates an exemplary embodiment of a method for controlling dispatch voice communications between fleets in a network, in accordance with the present invention.

FIG. 3 illustrates an exemplary embodiment of a method for controlling dispatch voice communications between fleets in a network, in accordance with the present invention. In step 301, a multi-fleet dispatch console 101 receives a request for a group call including dispatch stations in a plurality of fleets.

The multi-fleet dispatch console 101 may receive dispatch calls and call requests via the VPN 104 or 114 or via the RAN 109 or 119. The group call request may include a request to establish an ad-hoc dispatch talk group. The multi-fleet dispatch console 101 may connect to a group database via the VPN 104/114 to create the desired talk group. As described above, a UFMI, URI or other unique identifier may be used to identify a cross-fleet group call.

In step 302, a determination is made whether the requestor has the authority to establish the requested dispatch call. If the requestor does not have the necessary authority, a message indicating that the requestor is not authorized may be output in step 303.

If the authority of the requestor is established in step 302, then in step 304 the availability of the intended members of the requested group call is determined. For example, a group member could be busy (i.e., participating in an existing private or group call) or unavailable (i.e., the group member's dispatch station is off, not functioning correctly, etc.). If it is determined in step 304 that a dispatch station is currently participating in another call, the multi-fleet dispatch console 101 may drop the dispatch station from the other call and/or terminate the other call in step 305 by, for example, sending a call termination message to the dispatch station. In step 306, the requested group call is established by the multi-fleet dispatch console 101. In step 307, the multi-fleet dispatch console 101 continues to manage the established group call until the call is terminated.

In another exemplary embodiment of the present invention, there is a computer-readable medium encoded with a computer program for controlling dispatch voice communications between fleets in a network. The term "computer-readable medium" as used herein refers to any medium that participates in providing instructions for execution. Such a medium may take many forms, including but not limited to, non-volatile media, volatile media, and transmission media. Non-volatile media includes, for example, optical or magnetic disks. Volatile media includes, for example, dynamic memory. Transmission media includes coaxial cables, copper wire and fiber optics. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave, or any other medium from which a computer can read.

An exemplary embodiment of a computer-readable medium encoded with a computer program for controlling dispatch voice communications between fleets in a network is illustrated in FIG. 3, which is described above.

While the invention has been described in connection with various embodiments, it will be understood that the invention is capable of further modifications. This application is intended to cover any variations, uses or adaptation of the invention following, in general, the principles of the invention, and including such departures from the present disclosure as, within the known and customary practice within the art to which the invention pertains.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A multi-fleet dispatch console, comprising:
an interface coupled to dispatch talk groups of a first fleet provisioned and managed by a first dispatch console and a second fleet provisioned and managed by a second dispatch console;
a memory; and
a processor coupled to the interface and the memory, wherein the processor is configured to receive a request for a dispatch group call including dispatch stations in the first and second fleets and to establish a talk group comprising the dispatch stations in the first and second fleets and having a talk group identifier unique from any identifier used by the first and second dispatch consoles to enable the dispatch group call based upon the request,
wherein the multi-fleet dispatch console is configured with a higher priority than the first and second dispatch consoles to enable the multi-fleet dispatch console to terminate existing calls of the first or second dispatch consoles involving the dispatch stations prior to establishing the dispatch group call.

2. The multi-fleet dispatch console of claim 1, wherein the dispatch group call is an ad-hoc dispatch group call.

3. A multi-fleet dispatch console for controlling dispatch voice communications between fleets provisioned and managed by fleet dispatch consoles, comprising:
a first interface which receives a request to create an ad-hoc dispatch talk group that includes dispatch stations in a plurality of fleets for a dispatch group call;
a second interface which accesses a group database in a private wireless network; and
a processor, coupled to the first and second interfaces, which creates the ad-hoc dispatch talk group having a unique talk group identifier unique from any identifier used by the fleet dispatch consoles in the group database and establishes the dispatch group call, based on the received request,
wherein the multi-fleet dispatch console is configured with a higher priority than the first and second dispatch consoles to enable the multi-fleet dispatch console to terminate existing calls of the fleet dispatch consoles involving dispatch stations in the plurality of fleets prior to establishing the dispatch group call.

4. The multi-fleet dispatch console of claim 3, wherein the first interface is a radio access network interface and the second interface is a network interface.

5. The multi-fleet dispatch console of claim 3, wherein each of the first and second interfaces is a network interface.

6. A method for controlling dispatch voice communications between fleets in a network, comprising the acts of:
receiving a request at a multi-fleet dispatch console for a dispatch group call including dispatch stations in a plurality of fleets each provisioned and managed by a fleet dispatch console; and
establishing a talk group having a unique talk group identifier unique from any identifier used by any of the fleet dispatch consoles and comprising the dispatch stations in the plurality of fleets to enable the dispatch group call for the dispatch stations in the plurality of fleets based on the received request, and
dropping dispatch stations from any existing group calls controlled by a fleet dispatch console according to a message from the multi-fleet dispatch console.

7. The method of claim 6, further comprising the act of:
determining whether a requestor of the dispatch group call is authorized to establish the dispatch group call.

8. The method of claim 7, further comprising the act of:
outputting an authorization denial message, if the requestor is not authorized to establish the dispatch group call.

9. The method of claim 6, further comprising the act of:
determining an availability of each of the dispatch stations.

10. The method of claim 6, wherein the dispatch stations comprise mobile telephones.

11. The method of claim 6, wherein the dispatch group call is an ad-hoc dispatch group call.

12. A non-transitory computer-readable medium encoded with a computer program for controlling dispatch voice communications between fleets in a network, the computer program comprising instructions for:
receiving a request at a multi-fleet dispatch console for a dispatch group call for dispatch stations in a plurality of fleets each provisioned and managed by a fleet dispatch console; and
establishing a talk group having a unique talk group identifier unique from any identifier used by any of the fleet dispatch consoles and comprising the dispatch stations in the plurality of fleets to enable the dispatch group call for the dispatch stations in the plurality of fleets based on the received request, and
dropping dispatch stations from any existing group calls controlled by a fleet dispatch console according to a message from the multi-fleet dispatch console.

13. The computer-readable medium of claim 12, further comprising instructions for:
determining whether a requestor of the dispatch group call is authorized to establish the dispatch group call.

14. The computer-readable medium of claim 13, further comprising instructions for:
outputting an authorization denial message, if the requestor is not authorized to establish the dispatch group call.

15. The computer-readable medium of claim 12, further comprising instructions for:
determining an availability of each of the dispatch stations.

16. The computer-readable medium of claim 12, wherein the dispatch group call is an ad-hoc dispatch group call.

* * * * *